Patented May 14, 1929.

1,713,346

UNITED STATES PATENT OFFICE.

SYLVAN R. MERLEY, OF DOVER, NEW JERSEY, ASSIGNOR TO DOHERTY RESEARCH COMPANY, OF NEW YORK, N. Y., A CORPORATION OF DELAWARE.

SEPARATION OF POLYMERS FROM CRUDE-ALCOHOL MIXTURES.

No Drawing.   Application filed August 11, 1926. Serial No. 128,699.

The present invention relates to the production of alcohols from the olefines occurring in cracked petroleum material.

In my prior application, Serial No. 97,600, filed March 26, 1926, for "method for production of alcohols from olefines", I have disclosed a process wherein cracked petroleum material is treated with concentrated sulphuric acid of 66° Bé., or the like, to form alkyl sulphates which are then diluted with water and hydrolyzed. In said process heavy alcohols formed during a step of hydrolyzation are substantially water insoluble. These heavy alcohols absorb polymers formed in the process and rise to the surface of the alcohol solution forming a surface layer of polymers dissolved in a mixture of heavy alcohols. The surface layer just mentioned is decanted from the water soluble alcohols and dilute acid and the dilute mixture is then distilled. The separation of polymers from the water soluble alcohols by the heavier alcohols as described in said application is so complete that the water soluble or lighter alcohols obtained by the rectification of the dilute acid-alcohol mixture are substantially pure and require little subsequent treatment to meet commercial specifications.

I have found, however, that some petroleum products, when cracked to form gasoline or the like, do not yield enough heavy olefines to produce the required amount of heavy substantially water-insoluble alcohols to absorb all the polymers associated with the lighter and water-soluble alcohols as described in my said application.

The present invention is based upon the discovery that a straight chain hydrocarbon or a mixture of straight chain hydrocarbons may be used in place of the heavy water-insoluble alcohols for absorbing the polymers present in a dilute mixture of alkyl sulphates or of alcohol and acid. The straight chain hydrocarbon which preferably is used in accordance with the present invention is a mixture of paraffin or saturated hydrocarbons and this mixture is preferably mixed with the alkyl sulphates prior to the hydrolyzation step of the sulphates.

When the step of hydrolysis is performed prior to distillation for alcohols and with agitation of the alkyl sulphates the hydrocarbon may be added immediately before the step of hydrolysis. In this case the hydro-carbon assists what heavy alcohols are present to absorb the polymers from the alcohol-acid mixture and quickly rises to the surface with the heavy alcohols when the agitation is stopped at the end of the step of hydrolyzation, leaving the body of the mixture clear.

Another method according to the present invention and involving adding the hydrocarbon prior to the step of hydrolysis, is as follows:—the mixture of cold alkyl sulphates and polymers coming from the absorption step are diluted in a "drowning" tank as a preliminary to removal of polymers and to hydrolysis. Owing to the heat of dilution some hydrolysis occurs at this time and a top layer forms containing a good deal of the polymers or like bodies formed during absorption. When hydrocarbon is added at this time, practically all the polymers can be carried into the surface layer and decanted, leaving very little to be dealt with after hydrolysis. If desired, however, the hydrocarbon for absorbing the polymers may be added to the alcohol-acid mixture after hydrolysis has been completed. If this is done the mixture is then thoroughly agitated and allowed to settle. However, in this case, it will require considerable time for the solution to settle out clear. The hydrocarbon, together with polymers and heavy alcohols which are obtained by either of the above methods, rises to the surface forming a distinct surface layer. As soon as the alcohol-acid solution or sulphate solution below the surface layer has become clear, the surface layer is decanted. In case of an acid-alcohol solution, it is then distilled for alcohols. In case of a sulphate mixture, it is then hydrolyzed and the polymers and most of the other bad smelling impurities often contained in crude alcohols formed by the process described above being thus removed from the alcohols prior to distillation, the crude alcohols can be refined with a minimum of trouble and expense.

The hydrocarbon employed in the processes according to the present invention must be substantially insoluble in water. Otherwise some of it would be held in the dilute alcohol-acid mixture below the top layer and thereby retain some of the polymers in the mixture intended for distillation. The hydrocarbon used also should be substantially free from sulphonic acids and carefully purified as to sulphur compounds as well as free from nitrogen compounds. It should consist primarily of paraffin hydrocarbons.

Preferably the initial boiling point of the hydrocarbons is not less than 400° F. This is for the reason that the hydrocarbons of higher boiling point are less miscible with the dilute alkyl-sulphate solution. Its gravity is preferably between 26 and 36° A. P. I. The gravity of the oil has little effect on the process except that it should be low enough to permit rapid separation of the oil from the dilute alcohol and acid. The viscosity of the oil likewise has little effect on the process. It may fall between 35 and 300 Saybolt at 100° F. An oil containing no sulphur compounds, nitrogen compounds, by-products or unsaturated compounds, with a gravity of 26.5 to 27.1° A. P. I. and a Saybolt viscosity of from 268–279 at 100° F. has been used very satisfactorily for the purpose above described. However, I do not limit myself to any preferred viscosity or boiling point of the oil or to the paraffin hydrocarbons so long as the oil is essentially insoluble in water.

The presence of a small amount of sulphonic acids in the oil to be used for the purpose in question is not necessarily prohibited, but no sulphonic acids which break down or decompose slowly on heating to the temperature of distillation of the alcohols should be present. Otherwise the sulphonic acids will break down and produce the so-called "straw" odor in the crude alcohol mixture obtained by distillation. The sulphonic acids which do not decompose on heating to moderate temperatures are, nevertheless, objectionable in any large amount for the reason that they dissolve in the dilute alcohol-acid mixture and cause the retention therein of some of the polymers by holding in the dilute mixture some of the heavy alcohols which in turn hold some polymers with them in the dilute mixture.

The surface layer above mentioned and which has been decanted off contains higher alcohols as well as polymers. It is commercially desirable to recover the higher alcohols from the polymers and hydrocarbons in the surface layer and this can be done to some extent by washing the solution of hydrocarbons, polymers and heavy alcohols with water. A more effective separation of the heavy alcohols from the hydrocarbon and polymers may be effected by using the method described in my prior application, Serial No. 97,599, filed March 26, 1926, for "separation of the heavy alcohols from the polymers", and according to which the separation is achieved by washing the solution with a menstruum comprising benzene sulphonic acid and a water soluble alcohol such as isopropyl alcohol.

Having thus described my invention I claim:

1. A process of separating hydrocarbon polymers from alcohol-acid mixtures and alkyl sulphate mixtures containing such polymers which includes diluting the mixture with water and absorbing the polymers from the dilute mixture by water insoluble straight-chain hydrocabon and removing the hydrocarbon and polymer from the mixture prior to distillation of said mixture.

2. A process of removing hydrocarbon polymers from alcohol-acid mixtures and alkyl sulphate mixtures containing such polymers which includes diluting the mixture with water and absorbing the polymers from the dilute mixture by water insoluble straight-chain hydrocarbon containing substantially no sulphur or nitrogen compounds, and separating the hydrocarbon and polymers from the mixture prior to distillation of said mixture.

3. A process of removing hydrocarbon polymers from alcohol-acid mixtures and alkyl sulphate mixture contaning such polymers which includes diluting the mixture with water and absorbing the polymers from the dilute mixture by paraffin hydrocarbon having a boiling point not less than 400° F.

4. A process of removing hydrocarbon polymers from alcohol-acid mixtures and alkyl sulphate mixture containing such polymers which includes diluting the mixture with water and absorbing the polymers from the dilute mixture by paraffin hydrocarbon having a boiling point not less than 400° F. and a viscosity of less than 300 on the Saybolt viscosimeter.

5. A process of removing hydrocarbon polymers from alcohol-acid mixtures and alkyl sulfate mixtures containing such polymers, which includes diluting the mixture with water and absorbing the polymers from the dilute mixture by paraffin hydrocarbon containing substantially no sulfur or nitrogen compounds, having a boiling point not less than 400° F. and a viscosity of less than 300 on the Saybolt viscosimeter, and separating the hydrocarbon and polymers from the dilute mixture prior to distillation of said mixture.

In testimony whereof I affix my signature.

SYLVAN R. MERLEY.